US006633914B1

(12) United States Patent
Bayeh et al.

(10) Patent No.: US 6,633,914 B1
(45) Date of Patent: *Oct. 14, 2003

(54) SYSTEMS, METHODS AND COMPUTER PROGRAM PRODUCTS FOR HANDLING CLIENT REQUESTS FOR SERVER APPLICATION PROCESSING USING A THREAD POOL

(75) Inventors: Elias Bayeh, Cary, NC (US); Lin Davis, Cary, NC (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 220 days.

(21) Appl. No.: 09/128,948

(22) Filed: Aug. 5, 1998

(51) Int. Cl.[7] .............................................. G06F 15/16
(52) U.S. Cl. ...................... 709/227; 709/107; 709/202
(58) Field of Search ................................ 709/203, 202, 709/227, 29, 219, 107

(56) References Cited

U.S. PATENT DOCUMENTS

| 5,754,830 | A | * | 5/1998 | Butts et al. ................... 709/311 |
| 5,867,650 | A | * | 2/1999 | Osterman ...................... 709/203 |
| 5,928,323 | A | * | 7/1999 | Gosling et al. ............... 709/203 |
| 5,951,694 | A | * | 9/1999 | Choquier et al. .............. 714/15 |
| 5,961,586 | A | * | 10/1999 | Pedersen ....................... 709/201 |
| 6,003,084 | A | * | 12/1999 | Green et al. .................. 709/227 |
| 6,012,098 | A | * | 1/2000 | Bayeh et al. ................. 709/246 |
| 6,070,184 | A | * | 5/2000 | Blount et al. ................. 709/200 |
| 6,098,093 | A | * | 8/2000 | Bayeh et al. ................. 709/203 |
| 6,105,067 | A | * | 8/2000 | Batra ........................... 709/227 |
| 6,131,116 | A | * | 10/2000 | Riggins et al. ............... 709/219 |
| 6,163,797 | A | * | 12/2000 | Eckley et al. ................ 709/203 |
| 6,167,423 | A | * | 12/2000 | Chopra et al. ............... 709/100 |
| 6,477,561 | B1 | * | 11/2002 | Robsman ...................... 709/105 |

OTHER PUBLICATIONS

IBM, System for Dispatching from Multiple Thread Pools, IBM Technical Disclosure Bulletin, vol. 41, Issue 1, pp. 329–332, Jan. 1, 1998.*
Reiter et al., "Interaction between Java and LonWorks", IEEE 0–7803–4182–1/97, 1997, pp. 335–340.*

* cited by examiner

*Primary Examiner*—Glenton B. Burgess
*Assistant Examiner*—Bradley Edelman
(74) *Attorney, Agent, or Firm*—Myers Bigel Sibley & Sajovec, P.A.; A. Bruce Clay

(57) ABSTRACT

Systems, methods and computer program products are provided for handling client requests for server application processing wherein a connection between a client and server is transferred to a servlet. A client request from a server is transferred to a servlet via a server thread. The server thread is then returned to the server, thereby leaving an open connection with the requesting client. The open client connection is then retrieved and maintained by the servlet. Upon receiving the transferred client request, the servlet processes the client request and then sends processing results directly to the client via the retrieved connection.

22 Claims, 3 Drawing Sheets

SYSTEMS, METHODS AND COMPUTER PROGRAM PRODUCTS FOR HANDLING CLIENT REQUESTS FOR SERVER APPLICATION PROCESSING USING A THREAD POOL

FIELD OF THE INVENTION

The present invention relates generally to data processing systems, methods and computer program products and, more particularly, to data processing systems, methods and computer program products for improving the performance of servers and server applications.

BACKGROUND OF THE INVENTION

The paradigm for the Internet is that of a client-server relationship where clients communicate with servers. To provide greater access to the Internet, the communication protocols and languages utilized by clients and servers have become standardized. These protocols include the Hyper-Text Transfer Protocol (HTTP), which is the communication protocol used for communications between clients and servers, and the Transmission Control Protocol/Internet Protocol (TCP/IP), the TCP portion of which is the transport specific protocol for communication between computers or applications. Also standardized is the language in which clients and servers communicate which is called Hyper-Text Markup Language (HTML).

In the context of the World Wide Web (Web) client/server applications, a client may be a Web browser which acts as a user interface. A Web browser sends user requests to an appropriate Web server and formats and displays the HTML data returned from the Web server. A Web browser also evaluates the HTML data to determine if there are any embedded hyper-link statements in the HTML data which would require subsequent browser requests which would then be initiated by the browser. A Web server acts as the server for the client and processes the Web browsers requests and returns the requested response as an HTML data portion of a HTTP data stream.

A Web server typically has an HTTP daemon that forwards client requests to various server applications for processing, as appropriate. These server applications may be either local or remote to the Web server. When a client request for server application processing is received by a Web server, the HTTP daemon for the Web server dispatches a request to the appropriate server application. The HTTP daemon listens for a reply from the server application and then sends the reply from the server application to the requesting client via the Web server.

A Web server serves as an intermediary between a requesting client and a server application. A Web server is conventionally designed to have a finite number of server threads that process Web client requests. For a particular server application request, a server thread typically passes the request to the appropriate server application via an HTTP daemon and then waits for the server application to finish processing before returning to service a new client request. Accordingly, a Web server thread and socket associated with a client request remain "in-use" while a server application is processing a client request.

Unfortunately, the number of concurrent client connections a Web server can handle may be reduced as the number of "in-use" threads and sockets increase. Accordingly, a Web server's throughput and scalability may be reduced as server application requests from clients increase. In addition, server application requests may take longer to process than static Web client requests. Thus, the throughput of a Web server may be reduced further as the number of server application requests are increased. For example, a Web server may normally be able to handle 600 static Web client requests per second. However, the same Web server may only be able to handle 100 server application requests per second.

Because a Web server serves as an intermediary between a Web client and server application, server application response may be delayed in reaching a client. Furthermore, because a server application response travels through a Web server, the performance time of a server application may be negatively affected.

SUMMARY OF THE INVENTION

In view of the above discussion, it is an object of the present invention to allow Web servers to process server application requests from clients without reducing Web server throughput and scalability.

It is another object of the present invention to decrease response time between when a client makes a request to a server application and when the server application responds to the client with processing results.

These and other objects of the present invention are provided by systems, methods and computer program products for handling client requests for server application processing wherein a client request and a connection between the client and server is transferred to a server application queue via a server thread. The server thread is then returned to the server, thereby leaving an open connection with the requesting client. The open client connection is then retrieved and maintained by a server application, such as a servlet. Upon receiving the transferred client request, the servlet processes the client request and then sends processing results directly to the client via the retrieved connection.

Servers incorporating connection passing according to the present invention may be transparent to a client user. Furthermore, servers incorporating connection passing according to the present invention may be advantageous because a server thread can quickly return to a server's thread pool for receiving new client requests. Accordingly, a server's throughput and scalability may not be negatively affected even though the server receives an increase in server application requests. In addition, because a server may not be required to serve as an intermediary between a client and a server application, faster communication between the server application and a client may result.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Client-Server Communications

Figure 1:
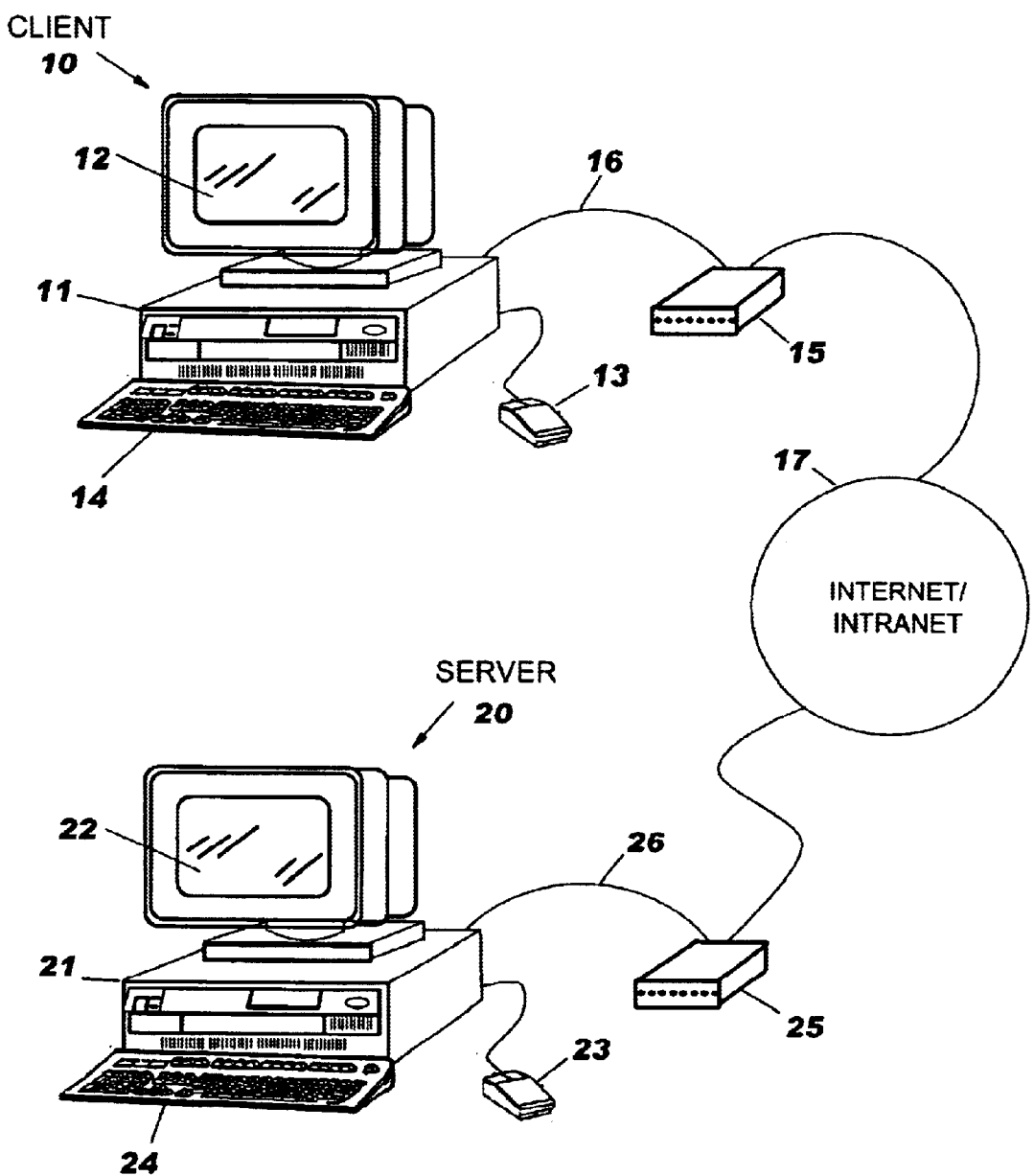
FIG. 1 illustrates the basic communication structure for an Internet based system in which the present invention may be utilized.

Referring now to FIG. 1, the basic communication structure for a client-server based system is depicted. As is known to those with skill in the art, client-server environments may include public networks, such as the Internet, and private networks often referred to as "intranets", local area networks (LANS) and wide area networks (WANs). Hereinafter, all references to server applications shall include server applications residing on servers connected to the Internet, to an intranet, and to LANs and WANs. The term "Internet" shall incorporate the term "intranet" and any references to accessing the Internet shall be understood to mean accessing an intranet and LANs and WANs, as well. Hereinafter, the term "computer network" shall incorporate publicly accessible computer networks and private computer networks.

As illustrated in FIG. 1, users may access an Internet server 20 via a computer or terminal referred to as a client 10. Exemplary clients 10 may include, but are not limited to, Apple®, Sun Microsystems®, IBM®, or IBM-compatible personal computers. A client 10 preferably includes a central processing unit 11, a display 12, a pointing device 13, a keyboard 14, access to persistent data storage, and an Internet connection 16 for connecting to the Internet 17. The Internet connection 16 may be made via a modem 15 connected to traditional phone lines, an ISDN link, a T1 link, a T3 link, via cable television, via an ethernet network, and the like. The Internet connection 16 may be made via a third party, such as an "Internet Service Provider" ("ISP") or the Internet connection 16 may be made by a direct connection of the client 10 to the Internet or indirectly via another device connected to the Internet. In the latter case, the client 10 is typically connected to this device via a LAN or WAN. The central processing unit 11 contains one or more microprocessors (not shown) or other computational devices and random access memory (not shown) or its functional equivalent, including but not limited to, RAM, FLASHRAM, and VRAM for storing programs therein for processing by the microprocessor[]s) or other computational devices. A portion of the random access memory and/or persistent data storage, referred to as "cache," is often utilized during communications between a client 10 and a server 20 (described in detail below) to store various data transferred from the server.

Preferably, a client 10 has an Intel® 80486 processor (or equivalent) with at least eight megabytes (8 MB) of RAM, and at least five megabytes (5 MB) of persistent computer storage for caching. Even more preferable is an Intel® Pentium® processor (or equivalent). However, it is to be understood that various processors may be utilized to carry out the present invention without being limited to those enumerated herein. A client 10, if an IBM®, or IBM-compatible personal computer, preferably utilizes either a Windows®3.1, Windows 95®, Windows NT®, Unix®, or OS/2® operating system. However, it is to be understood that a terminal not having computational capability, such as an IBM® 3270 terminal or a network computer (NC), or having limited computational capability, such as a network PC (Net PC) may be utilized in accordance with an embodiment of the present invention for accessing the Internet in a client capacity.

A user accesses an Internet server by establishing a TCP connection between the client 10 and a server 20 (referred to hereinafter as Web clients and Web servers). For the majority of Internet communications, a Web client communicates with a Web server using HTTP protocol over the TCP connection between the Web client and Web server. The data transferred between the Web client and the Web server are HTTP data objects (e.g. HTML data). A Web server may be a proxy that receives requests from a number of Web clients and routes the requests to the appropriate Web server. A Web server may also be referred to as an HTTP server.

A Web server 20 may have a configuration similar to that of a Web client 10 and may include a central processing unit 21, a display 22, a pointing device 23, a keyboard 24, access to persistent data storage, and an Internet connection 26 for connecting to the Internet 17 via a modem 25, or otherwise. It is preferable that a Web server have an Intel® Pentium® processor or equivalent, at least sixteen megabytes (16 MB) of RAM, and at least eight hundred megabytes (800 MB) of data storage. However, a Web server 20 may be implemented using other processors and via other computing devices, including, but not limited to, mainframe computing systems and mini-computers. Web server software handles requests from clients for documents, whether they are text, graphic, multimedia, or virtual. The Web server software may run under the operating system of the Web server 20.

It is understood that a client or Web server or other apparatus configured to execute program code embodied within computer usable media, operates as means for performing the various functions and carries out the methods of the various operations of the present invention.

Servlets

Servlets are Java® applications that can extend the functionality of Web servers. Servlets may be referred to as server-side applets or applications. Similar to the way applets run on a browser and extend a browser's capabilities, servlets run on a Java-enabled Web server and extend the Web server's capabilities. Servlets use classes and methods in the JavaSoft Java Servlet Application Programming Interface (API). The JavaSoft Java Servlet Application Programming Interface (API) is described at http://www.ibm.com/java/servexp/sedocd.html, which is incorporated herein by reference in its entirety. As is known to those skilled in this art, servlets may be local or remote. That is, servlets may reside on a Web server receiving a request from a Web client or may be located on a server remotely located from the Web server receiving a Web client request.

Connection Passing

Figure 2:
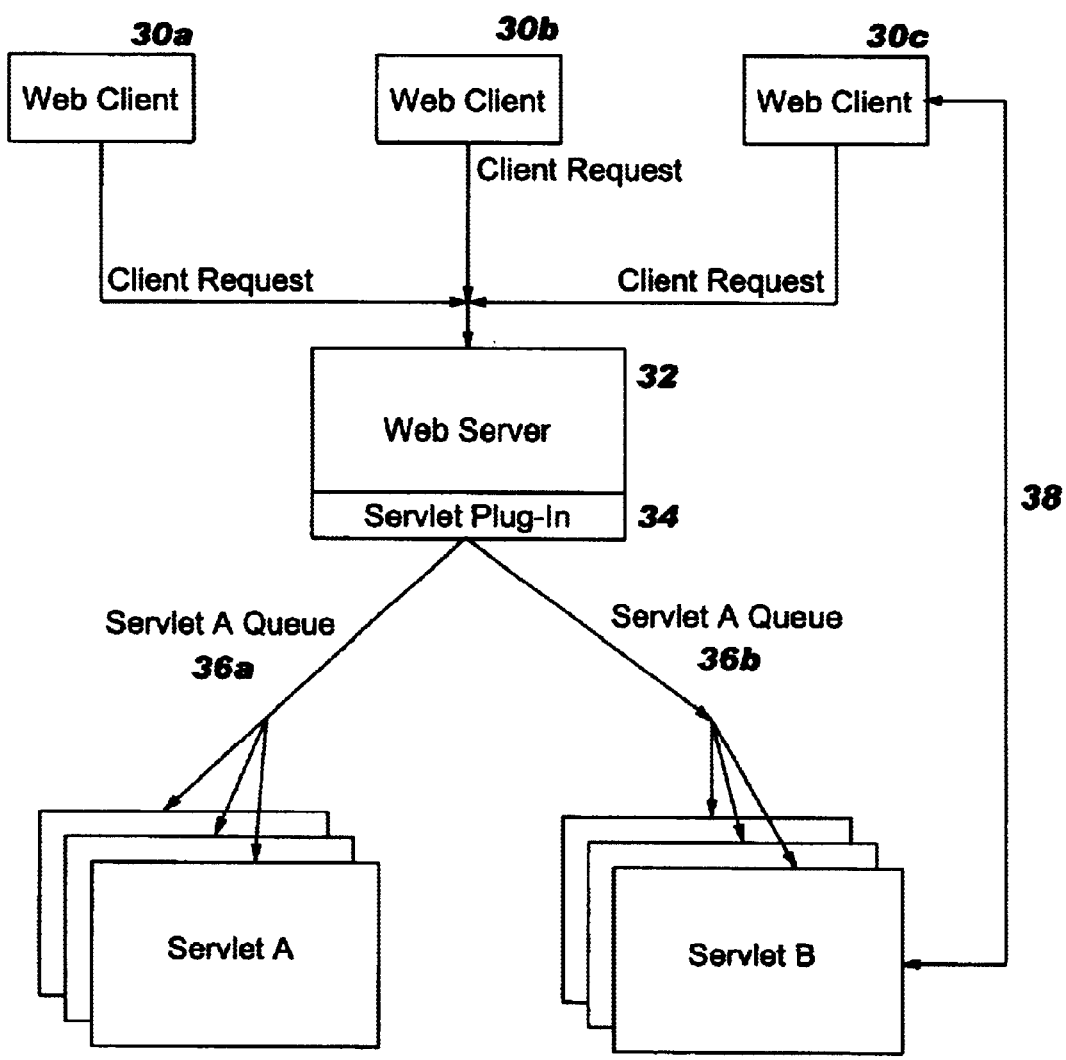
FIG. 2 schematically illustrates handling client requests for server application processing wherein a client connection is passed to a server application, according to the present invention.

Referring now to FIG. 2, a preferred client-server configuration for handling client requests for server application processing, according to the present invention, is illustrated. A plurality of Web clients 30a–30c are illustrated making requests to a Web server 32. As is understood by those skilled in this art, the Web server 32 processes requests from the Web clients 30a–30c and sends responses back to each respective Web client. The Web server 32 includes a servlet plug-in component 34 for dispatching requests from the clients 30a–30c to Servlet A or Servlet B for server application processing. The servlet plug-in waits for a response from Servlet A and/or Servlet B and then sends the servlet response to a client via the Web server 32. A particularly preferred servlet plug-in 34 is the WebSphere Application Server by IBM. Servlet plug-in components are well understood by those skilled in this art and need not be described further herein.

In the illustrated embodiment, Servlet A and Servlet B each have respective queues 36a, 36b for holding Web client requests until processing time. When the Web server 32 receives a request from-a Web client 30a–30c for servlet processing, the servlet plug-in 34 dispatches the client request, via a server thread, to the appropriate servlet queue. As is known to those skilled in this art, a server thread represents a unit of work within a server. Every client request to a server maps to a thread which exists to provide a path (connection) back to the requesting client through which a server response is transmitted to the requesting client.

According to the present invention, when a client request is dispatched to a servlet via a server thread, the server thread does not wait for a response from the servlet. Rather, the server thread returns to the Web server thread pool to become available to receive other client requests. As a result, the connection between a requesting client and server becomes open. An open connection is an active thread.

According to the present invention, a servlet takes over the open connection with a requesting client, processes the client request, and communicates a response directly back to the requesting client via the connection. The server no longer serves as an intermediary between the requesting client and the requested servlet. Accordingly, server resources (threads) can be released quickly and do not become tied-up with client requests for server application processing. Accordingly, server throughput and scalability are not impaired by client requests for servlet and other server application processing.

Still referring to FIG. 2, Web client 30c has made a request for processing by Servlet B. The request has been passed to Servlet B via a server thread as described above. Servlet B has taken over the connection with the Web client 30c as illustrated schematically by line 38. Servlet B maintains the transferred connection 38 with Web client 30c and sends processing results directly to the client via the connection 38. The transferred connection 38 remains a two-way connection allowing requests and responses between the client 30c and Servlet B.

It is understood that the present invention is not limited to Web servers and Web clients. Various types of clients and servers utilizing different protocols can be utilized in accordance with the present invention.

Figure 3:
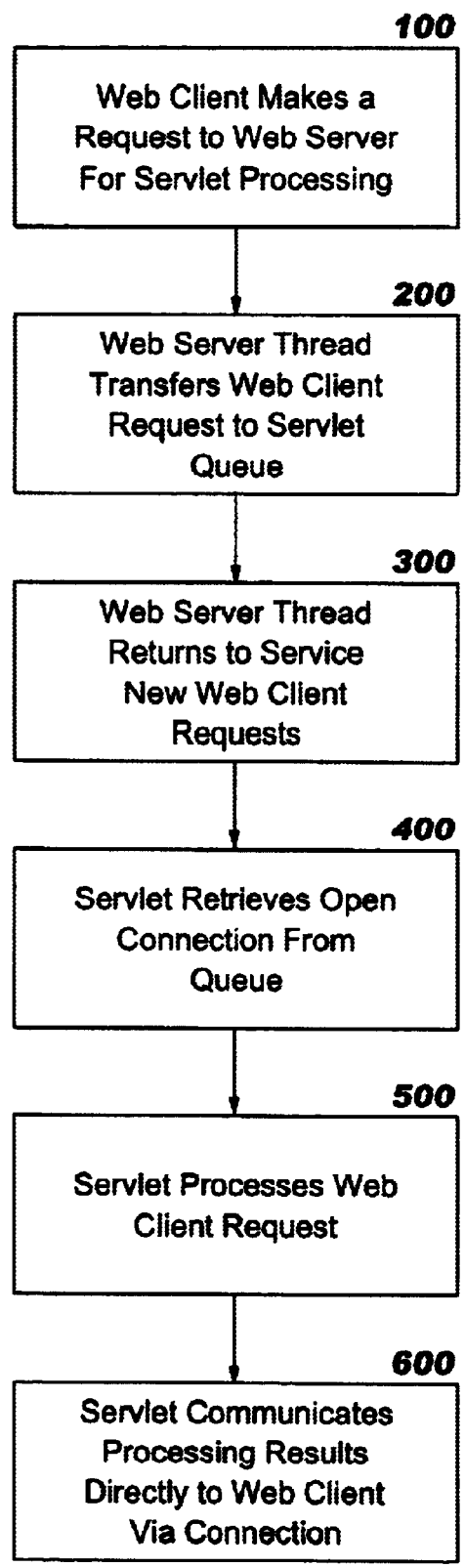
FIG. 3 schematically illustrates operations for handling client requests for server application processing, according to the present invention.

Referring now to FIG. 3, operations for handling client requests for server application processing, according to the present invention, are schematically illustrated. A Web client makes a request for servlet processing to a Web server (Block 100). The Web server transfers the client request to a servlet queue via a server thread (Block 200). The server thread returns to the server, thereby leaving an open client connection in the servlet queue (Block 300). In essence, the client connection is transferred to the servlet by returning the server thread to the server. The server thread is then ready to service new Web client requests.

At processing time, a servlet retrieves the open client connection from the queue (Block 400) and maintains the connection with the client until the processing results are complete and transmitted to the client. As is known to those skilled in this art, information about the client connection is passed to the servlet queue via the server thread so that the servlet can resume the same point of the client connection. The type of client connection information passed may depend upon the specific implementation. Exemplary information includes request headers, TCP-IP socket handles, and the like.

Upon retrieving the client request and connection from the queue, the servlet processes the client request (Block 500) and then sends processing results directly to the client via the transferred connection (Block 600). Typically, the connection ends after processing results have been transmitted directly to the client. However, the connection could remain open for future requests directly from the client. Once the connection ends, a new client request goes back through the Web server and the above-described process of connection passing takes place.

It will be understood that each block of the flowchart illustrations of FIG. 3 and combinations of blocks in the flowchart illustrations of FIG. 3, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of handling a client request to a server for server application processing, the method comprising the steps of:
   allocating a server thread from a pool of available server threads to process the client request;
   transferring the client request from the allocated server thread to a server application;
   returning the allocated server thread to the pool of available server threads; and
   retrieving an open two-way connection resulting from returning the server[]thread to the pool of available server threads so as to transfer the two-way connection to the server application, wherein the transferred two-way connection allows requests and responses directly between the client and the server application independently of the returned server thread.

2. A method according to claim 1 further comprising the steps of:
   responsive to receiving the transferred client request, processing the client request via the server application; and
   sending results of the processed client request from the server application to the client via the transferred two-way connection independently of the returned server thread.

3. A method according to claim 1 wherein the step of transferring the client request from the allocated server thread to the server application comprises transferring the client request to a server application queue.

4. A method according to claim 1, wherein the step of retrieving the open two-way connection comprises passing information about the two-way connection to the server application.

5. A method according to claim 1, wherein the client is a Web client and the server is a Web server.

6. A method according to claim 1, wherein the server application is a servlet.

7. A method of handling a client request to a server for server application processing, the method comprising the steps of:
   allocating a server thread from a pool of available server threads to process the client request;
   transferring the client request from the allocated server thread to a server application;
   returning the allocated server thread to the pool of available server threads, thereby leaving an open two-way connection with the requesting client;
   retrieving the open two-way client connection and maintaining the two-way connection between the client and the server application, wherein the retrieved two-way connection allows requests and responses directly between the client and the server application independently of the returned server thread;
   responsive to receiving the transferred client request, processing the client request via the server application; and
   sending results from the server application processing to the client from the server application via the retrieved two-way connection independently of the returned server thread.

8. A method according to claim 7 wherein the step of transferring the client request from the allocated server thread to the server application comprises transferring the client request to a server application queue.

9. A method according to claim 7, wherein the step of transferring the client request from the allocated server thread to the server application comprises passing information about the two-way connection to the server application.

10. A method according to claim 7, wherein the client is a Web client and the server is a Web server.

11. A method according to claim 7, wherein the server application is a servlet.

12. A method of making a client request for server application processing to a server, the method comprising the steps of:
    allocating a server thread from a pool of available server threads to process the client request;
    transferring the client request from the allocated server thread to a server for server application processing;
    returning the allocated server thread to the pool of available server threads;
    retrieving an open two-way connection resulting from returning the server thread to the pool of available server threads so as to transfer the two-way connection to the server application, wherein the transferred two-way connection allows requests and responses directly between the client and the server application independently of the returned server
    receiving processing results from a server application via the two-way connection retrieved from the server.

13. A method according to claim 12, wherein the client is a Web client and the server is a Web server.

14. A method according to claim 12, wherein the server application is a servlet.

15. A system for handling a client request to a server for server application processing, comprising:
    means for allocating a server thread from a pool of available server threads to process the client request;
    means for transferring the client request from the allocated server thread to a server application;
    means for returning the allocated server thread to the pool of available server threads, thereby leaving an open two-way connection with the requesting client;
    means for retrieving the open two-way client connection and maintaining the two-way connection between the client and the server application, wherein the retrieved two-way connection allows requests and responses directly between the client and the server application independently of the returned server thread;
    responsive to receiving the transferred client request, means for processing the client request via the server application; and
    means for sending results from the server application processing directly to the client from the server application via the retrieved two-way connection independently of the returned server thread.

16. A system according to claim 15 wherein the means for transferring the client request from the allocated server thread to the server application comprises means for transferring the client request to a server application queue.

17. A system according to claim 15, wherein the means for transferring the client request from the allocated server thread to the server application comprises means for passing information about the two-way connection to the server application.

18. A system according to claim 15, wherein the client is a Web client and the server is a Web server.

19. A system according to claim 15, wherein the server application is a servlet.

20. A computer program product for handling a client request to a server for server application processing, the computer program product comprising a computer usable storage medium having computer readable program code means embodied in the medium, the computer readable program code means comprising:

computer-readable program code means for allocating a server thread from a pool of available server threads to process the client request;

computer readable program code means for transferring the client request from the allocated server thread to a server application;

computer readable program code means for returning the allocated server thread to the pool of available server threads, thereby leaving an open two-way connection with the requesting client;

computer readable program code means for retrieving the open two-way client connection and maintaining the two-way connection between the client and the server application, wherein the retrieved two-way connection allows requests and responses directly between the client and the server application independently of the returned server thread;

responsive to receiving the transferred client request, computer readable program code means for processing the client request via the server application; and computer readable program code means for sending results from the server application processing directly to the client from the server application via the retrieved two-way connection independently of the returned server thread.

21. A computer program product according to claim 20 wherein the computer readable program code means for transferring the client request from the allocated server thread to the server application comprises computer readable program code means for transferring the client request to a server application queue.

22. A computer program product according to claim 20, wherein the computer readable program code means for transferring the client request from the allocated server thread to the server application comprises computer readable program code means for passing information about the two-way connection to the server application.

* * * * *